(12) United States Patent
Abramoski et al.

(10) Patent No.: US 10,604,108 B2
(45) Date of Patent: Mar. 31, 2020

(54) SEATBELT WEBBING GUIDE

(71) Applicant: Ford Global Technologies, LLC, Dearborn, MI (US)

(72) Inventors: Edward Joseph Abramoski, Canton, MI (US); Edward Joseph DeSmet, Jr., Canton, MI (US); Christopher Donald Schop, Chelsea, MI (US); Travis Justin Raines, Grosse Ile, MI (US); Kris Allyn Warmann, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 15/825,009

(22) Filed: Nov. 28, 2017

(65) Prior Publication Data

US 2019/0161055 A1 May 30, 2019

(51) Int. Cl.
*B60N 2/68* (2006.01)
*B60R 22/26* (2006.01)
*B60R 22/18* (2006.01)

(52) U.S. Cl.
CPC .............. *B60R 22/26* (2013.01); *B60N 2/688* (2013.01); *B60R 2022/1818* (2013.01)

(58) Field of Classification Search
None
See application file for complete search history.

(56) References Cited

U.S. PATENT DOCUMENTS

| | | | | |
|---|---|---|---|---|
| 4,642,853 A | * | 2/1987 | Plesniarski | B60R 22/24 24/163 R |
| 5,516,148 A | * | 5/1996 | Ohira | B60R 22/24 280/808 |
| 5,590,907 A | * | 1/1997 | McQueen, II | B60R 22/24 280/801.1 |
| 5,730,499 A | * | 3/1998 | Salisbury, Jr. | B60R 22/20 280/808 |
| 5,979,991 A | * | 11/1999 | Lewandowski | B60R 22/26 297/391 |
| 7,273,232 B2 | * | 9/2007 | Fontecchio | B60R 22/022 280/808 |
| 9,855,872 B2 | * | 1/2018 | Supernavage | B60R 22/26 |
| 2008/0054703 A1 | * | 3/2008 | Okazaki | B60N 2/688 297/483 |
| 2008/0284233 A1 | | 11/2008 | Stiegler et al. | |
| 2013/0278042 A1 | * | 10/2013 | Wenz | B60N 2/58 297/463.1 |

FOREIGN PATENT DOCUMENTS

| | | |
|---|---|---|
| CN | 102673512 A | 9/2012 |
| CN | 203996098 U | 12/2014 |
| CN | 204801714 U | 11/2015 |
| JP | 2006088876 A | 4/2006 |
| KR | 20140072490 A | 6/2014 |
| WO | 200158727 A1 | 8/2001 |

* cited by examiner

*Primary Examiner* — Sarah B McPartlin
(74) *Attorney, Agent, or Firm* — Frank A. MacKenzie; Bejin Bieneman PLC

(57) ABSTRACT

A restraint system includes a webbing-guide shell including a guide portion and a sloping portion, and a member reinforcing the sloping portion. The guide portion includes a slot and an opening from the slot through the guide portion, and the sloping portion includes a top surface sloping downwardly in a vehicle-inboard direction. The material of the member is stronger than the material of the webbing-guide shell.

20 Claims, 6 Drawing Sheets

US 10,604,108 B2

SEATBELT WEBBING GUIDE

BACKGROUND

Vehicles include seatbelts for each of the seats onboard. The seatbelt includes webbing that, when the seatbelt is buckled, extends across an occupant of the seat. An anchor attaches one end of the webbing to a seat frame. The other end of the webbing feeds into a retractor, which includes a spool that pays out and retracts the webbing. A tongue slides freely along the webbing and, when engaged with a buckle, divides the webbing into a lap band and a shoulder band. One type of seatbelt is a three-point harness, meaning that the webbing is attached at three points around the occupant when fastened: the anchor, the retractor, and the buckle.

DETAILED DESCRIPTION

Figure 1:
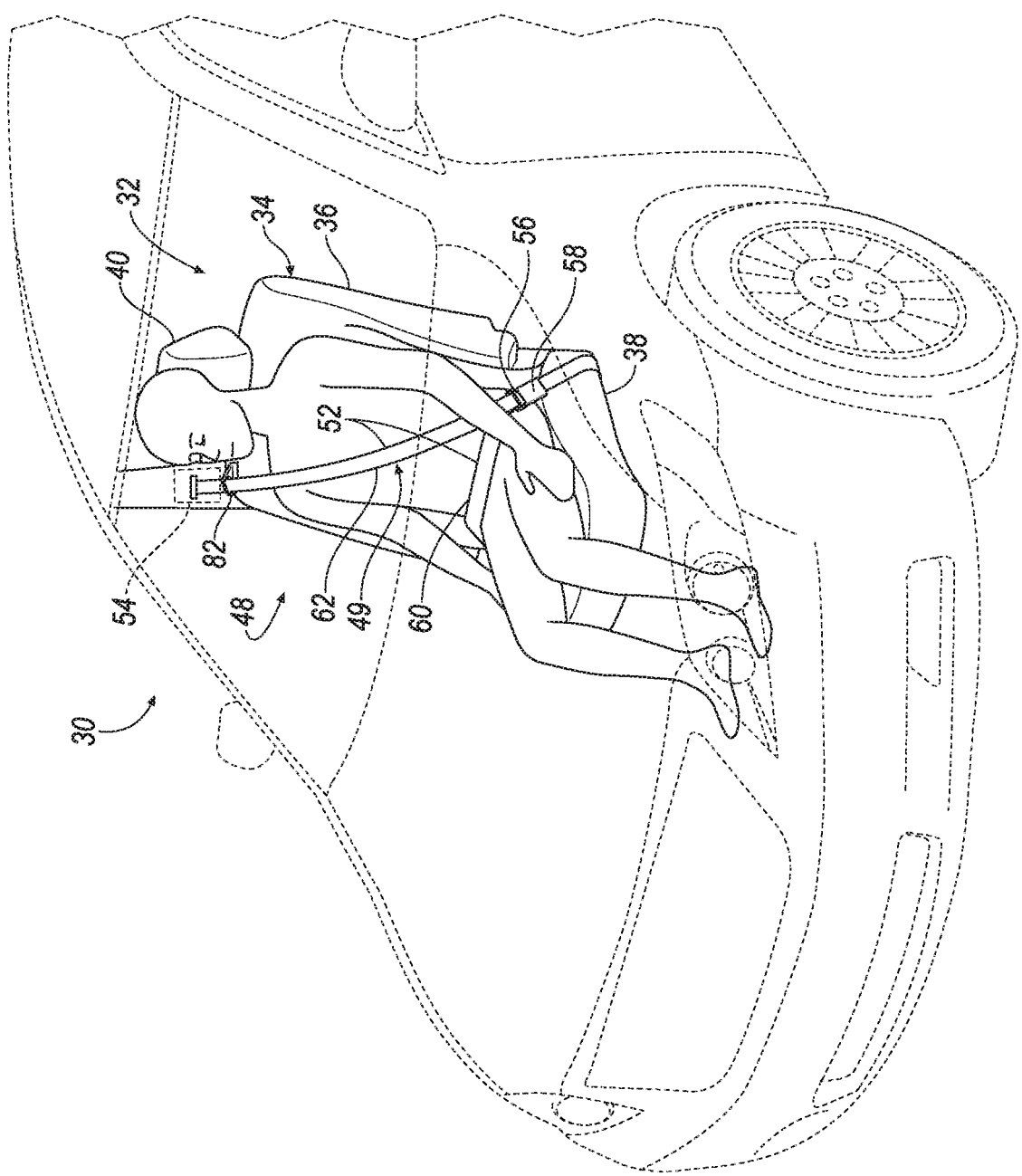
FIG. 1 is a perspective view of a vehicle including a seat.

A restraint system including a webbing-guide shell including a guide portion and a sloping portion, and a member reinforcing the sloping portion. The guide portion includes a slot and an opening from the slot through the guide portion, and the sloping portion includes a top surface sloping downwardly in a vehicle-inboard direction. The material of the member is stronger than the material of the webbing-guide shell.

The top surface may slope at less than 45° from horizontal.

The restraint system may include a seat frame, and the member may be fixed to the seat frame. The member may be fastened to the seat frame. The member may be fixed to a vehicle-outboard half of a top surface of the seat frame. The restraint system may include a retractor positioned behind the webbing-guide shell. The restraint system may include a webbing elongated from the retractor to in front of the webbing-guide shell. The restraint system may include a covering extending around the seat frame and between the webbing-guide shell and the seat frame.

The member may be press-fit into the webbing-guide shell.

The member may include a vertical portion elongated vertically and a horizontal portion elongated horizontally. The vertical portion may include a top edge sloping at substantially the same angle as the top surface relative to horizontal. The restraint system may include a fastener extending through the horizontal portion. The webbing-guide shell may include a hole positioned to permit access to the fastener, and the restraint system may further include a cover engageable with the hole. The hole may be positioned on the sloping portion below the top surface. The vertical portion may be press-fit into the webbing-guide shell.

The webbing-guide shell may be a single piece. The member may be a single piece.

The webbing-guide shell may be plastic.

The member may be metal. The member may be steel.

A restraint system 48 includes a webbing-guide shell 68 including a guide portion 70 and a sloping portion 72, and a member 66 reinforcing the sloping portion 72. The guide portion 70 includes a slot 74 and an opening 76 from the slot 74 through the guide portion 70, and the sloping portion 72 includes a top surface 78 sloping downwardly in a vehicle-inboard direction. The material of the member 66 is stronger than the material of the webbing-guide shell 68.

The webbing guide 64 allows webbing 52 to be placed inside or outside of the webbing guide 64 depending on an occupant's choice. The occupant could remove the webbing 52 from the webbing guide 64 when, e.g., folding down a seat 34 so that the webbing 52 provides less obstruction for loading the vehicle 30. The webbing guide 64 is operational both when the webbing 52 is in the webbing guide 64 and in scenarios where the occupant purposefully or inadvertently positions the webbing 52 outside the webbing guide 64. When the webbing 52 is outside of the webbing guide 64, the webbing guide 64 provides nominal or no twist to the webbing 52, and nominal or no effect on load limiting and/or pretensioning of the webbing 52. The webbing guide 64 is designed to increase the likelihood of resisting damage that would affect performance during an impact.

With reference to FIG. 1, the vehicle 30 includes a passenger cabin 32 to house occupants, if any, of the vehicle 30. The passenger cabin 32 includes a plurality of the seats 34, such as one or more front seats 34 disposed at a front of the passenger cabin 32 and one or more back seats 34 disposed behind the front seats 34. The passenger cabin 32 may also include third-row seats 34 at a rear of the passenger cabin 32. In FIG. 1, the seat 34 is shown to be a bucket seat, but the seats 34 may be other or multiple different types. The position and orientation of the seats 34 and components thereof may be adjustable by an occupant.

Figure 2:
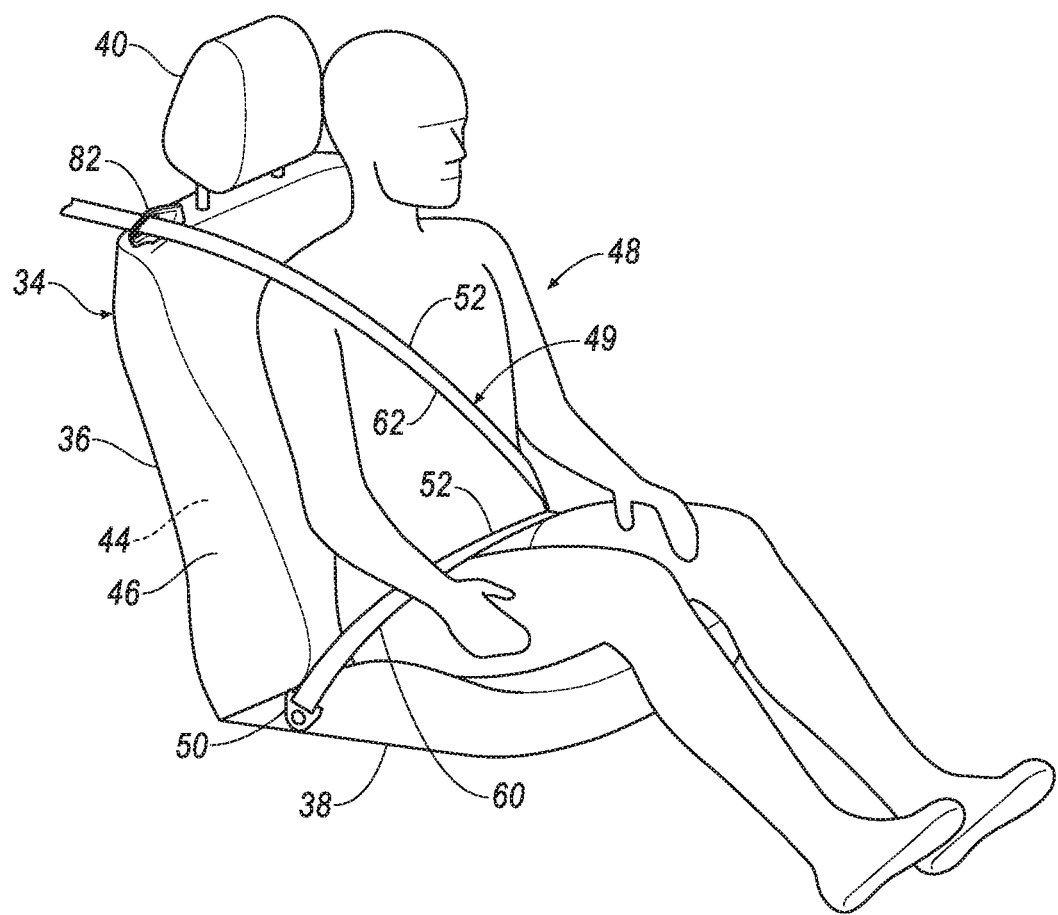
FIG. 2 is a perspective view of the seat.
Figure 3:
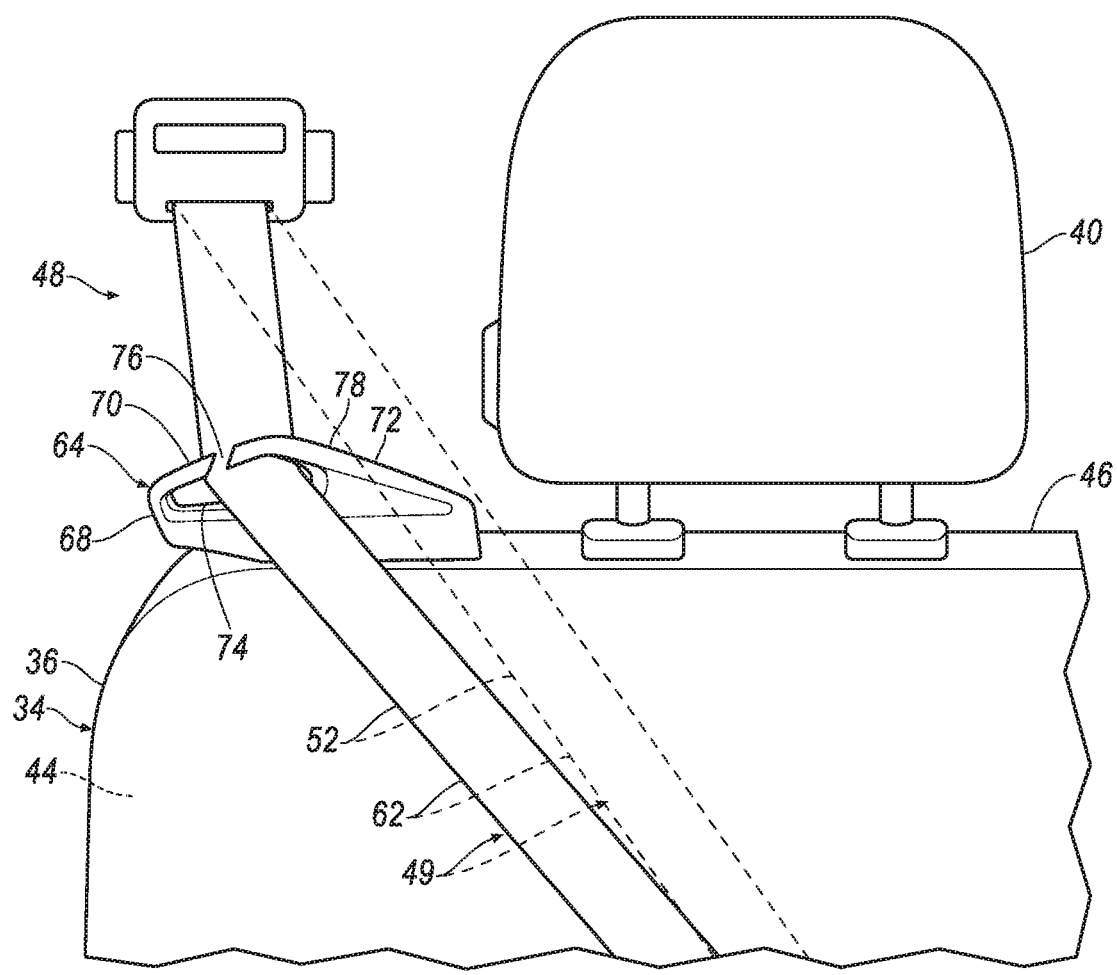
FIG. 3 is a front view of a portion of the seat including a webbing guide.
Figure 4:
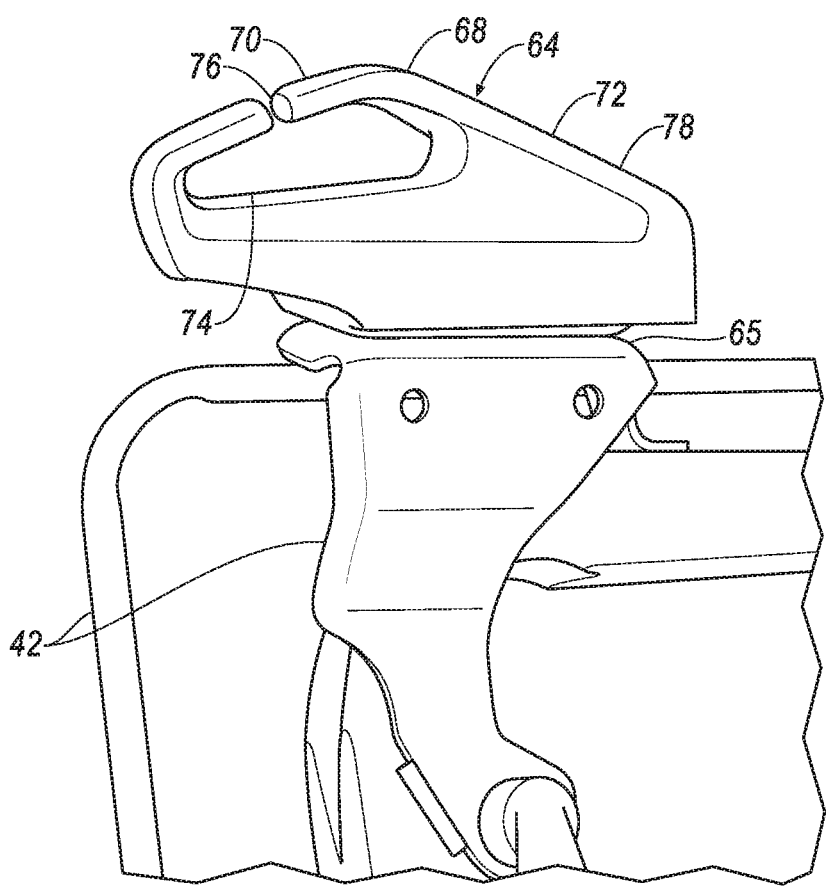
FIG. 4 is a front view of a frame of the seat with the webbing guide.

With reference to FIG. 2, the seat 34 may include a seatback 36, a seat bottom 38, and a headrest 40. The headrest 40 may be supported by the seatback 36 and may be stationary or movable relative to the seatback 36. The seatback 36 may be supported by the seat bottom 38 and may be stationary or movable relative to the seat bottom 38. The seatback 36, the seat bottom 38, and/or the headrest 40 may be adjustable in multiple degrees of freedom. Specifically, the seatback 36, the seat bottom 38, and/or the headrest 40 may themselves be adjustable, in other words, adjustable components within the seatback 36, the seat bottom 38, and/or the headrest 40, and/or may be adjustable relative to each other.

Figure 5:
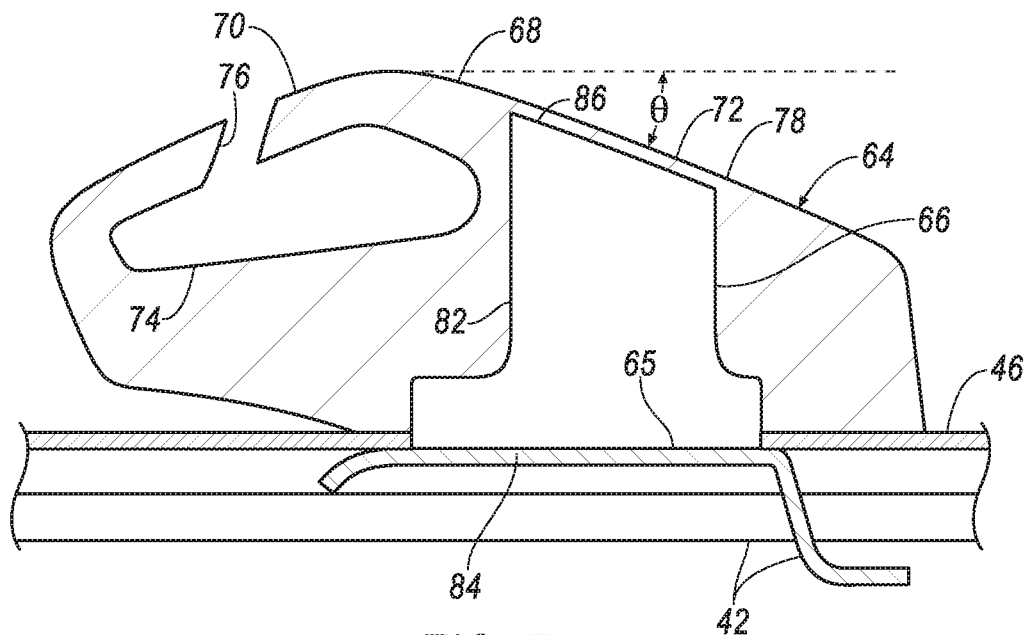
FIG. 5 is a front cross-sectional view of a portion of the seat.

With reference to FIG. 5, the seatback 36 includes a seat frame 42. The seat frame 42 may include panels and/or may include tubes, beams, etc. The seat frame 42 may be formed of any suitable plastic material, e.g., carbon fiber reinforced plastic (CFRP), glass fiber-reinforced semi-finished thermoplastic composite (organosheet), etc. Alternatively, for example, some or all components of the seat frame 42 may be formed of a suitable metal, e.g., steel or aluminum.

With reference to FIG. 2, a cushion 44 is supported on the seat frame 42. The cushion 44 may be made of cushioning material and covered with a covering 46. The cushion 44 may be formed of foam or any other suitable supportive material. The covering 46 may be formed of cloth, leather, faux leather, or any other suitable material. The covering 46 extends around the cushion 44 and the seat frame 42. The covering 46 may be stitched in panels around the cushion 44 and the seat frame 42.

With reference to FIG. 2, the seat 34 includes the restraint system 48. The restraint system 48 includes a seatbelt 49, which includes the webbing 52. The seatbelt 49 includes an anchor 50 and a retractor 54 each fixed to other components of the vehicle 30. The anchor 50 fixes one end of the webbing 52 relative to the seat frame 42. The other end of the webbing 52 feeds into the retractor 54, which may include a spool (not shown) that extends and retracts the webbing 52. A tongue 56 slides freely along the webbing 52 and, when engaged with a buckle 58, divides the webbing 52 into a lap band 60 and a shoulder band 62. The seatbelt 49 may be a three-point harness, meaning that the webbing 52 is attached at three points around the occupant when fastened: the anchor 50, the retractor 54, and the buckle 58. The seatbelt 49 may, alternatively, include another number and/or arrangement of attachment points.

With reference to FIGS. 3-9, the restraint system 48 includes the webbing guide 64. The webbing guide 64 may be attached to the seat 34, e.g., to the seatback 36, e.g., to a vehicle-outboard half of a top surface 65 of the seat frame 42 of the seatback 36. The retractor 54 may be positioned behind, i.e., in a vehicle-rearward direction from, the webbing guide 64, and the retractor 54 may be positioned above, i.e., in a vehicle-upward direction from, the webbing guide 64, and the retractor 54 may be positioned outboard of the webbing guide 64. When the tongue 56 is buckled to the buckle 58, the webbing 52 is elongated from the retractor 54 behind the webbing guide 64 to in front of the webbing guide 64, and the webbing 52 then extends in front of, i.e., in a vehicle-forward direction from, the seatback 36.

Figure 6:
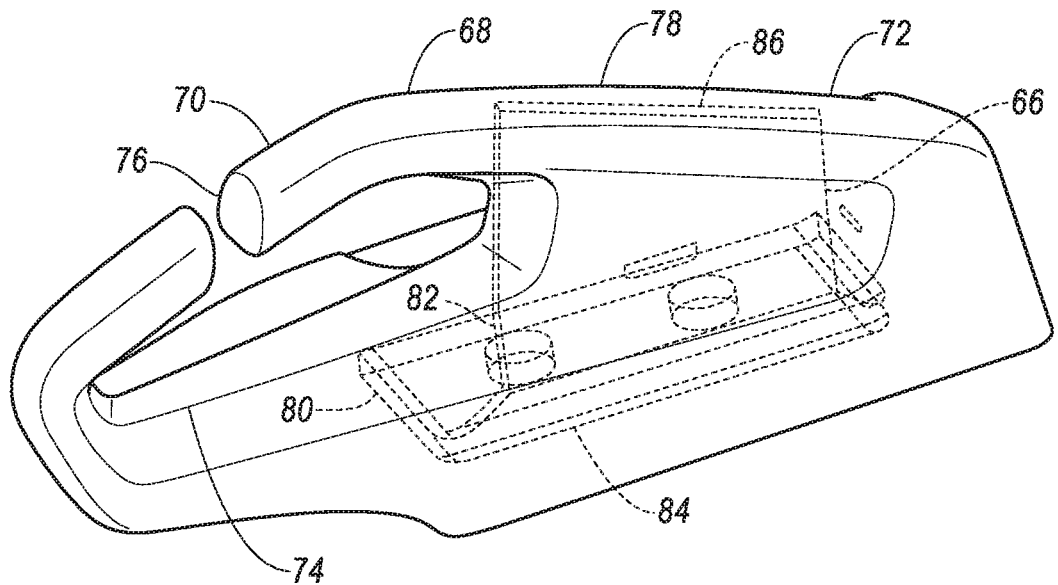
FIG. 6 is a perspective view of the webbing guide.
Figure 9:
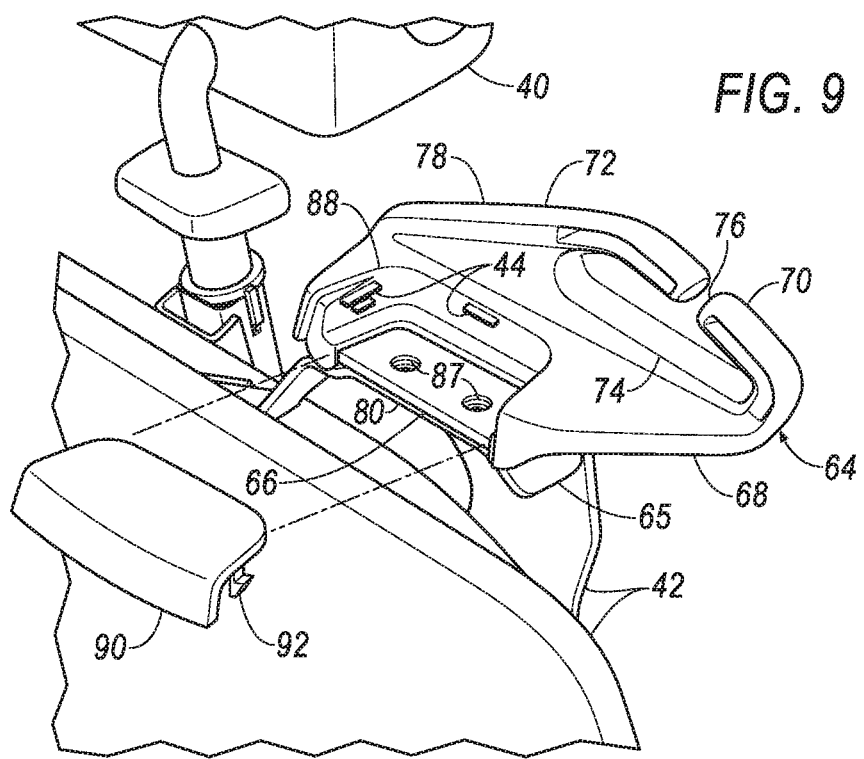
FIG. 9 is a top view of the webbing guide with a cover removed for illustration.

With reference to FIGS. 5, 6, and 9, the webbing guide 64 includes the member 66 and the webbing-guide shell 68. The member 66 is disposed inside the webbing-guide shell 68. The webbing-guide shell 68 may surround the member 66 on all sides except the bottom, i.e., the side of the member 66 facing in a vehicle-downward direction. The member 66 may be press-fit into the webbing-guide shell 68, i.e., the member 66 fits inside the webbing-guide shell 68 tightly enough that friction holds the member 66 inside the webbing-guide shell 68. For example, the webbing guide 64 may be formed by heat staking the member 66 into the webbing-guide shell 68.

With reference to FIGS. 3-9, the webbing-guide shell 68 may be integral, i.e., a single piece, i.e., continuous with no seams through the webbing-guide shell 68. The webbing-guide shell 68 includes the guide portion 70 and the sloping portion 72. The guide portion 70 is disposed in a vehicle-outboard and seat-outboard direction from the sloping portion 72, and the sloping portion 72 is disposed in a vehicle-inboard and seat-inboard direction from the guide portion 70.

The guide portion 70 defines the slot 74 and the opening 76. The slot 74 may be sized to be taller and wider than a cross-section of the webbing 52, that is, may be sized to permit the webbing 52 to slide freely through the slot 74. The opening 76 may be a gap from the slot 74 to outside the guide portion 70. The opening 76 may be wider than a thickness of the webbing 52, and the opening 76 may thus permit the webbing 52 to enter and be removed from the slot 74 by an occupant. The webbing 52 may be placed in the slot 70, as shown in solid lines in FIG. 3, or outside the slot 70, as shown in dashed lines in FIG. 3.

The sloping portion 72 includes the top surface 78. The top surface 78 faces generally up, i.e., in a vehicle-upward direction. The top surface 78 may be generally straight. The top surface 78 slopes downwardly in a vehicle-inboard direction; i.e., the top surface 78 slopes downwardly in a direction away from the guide portion 70. The top surface 78 may slope at an angle θ less than 45° from horizontal. For the purposes of this disclosure, "horizontal" is defined as along a plane orthogonal to the direction of gravity when the seat 34 has an orientation the same as when the vehicle 30 is on level ground. The angle θ is acute relative to the top surface 65 of the seat frame 42. The angle θ may be less than 45° relative to a plane parallel to the top surface 65 of the seat frame 42.

With reference to FIGS. 5, 6, and 9, the member 66 is fixed to the vehicle-outboard half of the top surface 65 of the seat frame 42. The member 66 is shaped and positioned to reinforce the sloping portion 72 of the webbing-guide shell 68; that is, the member 66 is shaped and positioned to resist collapse or deformation of the sloping portion 72. The member 66 is shaped and positioned to transfer force from the sloping portion 72, e.g., from the top surface 78, to the seat frame 42. In other words, when a force pushes downward on the top surface 78 of the sloping portion 72, the member 66 resists the force and transmits the force to the seat frame 42.

The member 66 may be integral, i.e., a single piece, i.e., continuous with no seams through the webbing-guide shell 68. The member 66 includes a horizontal portion 80 and a vertical portion 82. The horizontal portion 80 is elongated horizontally and in a vehicle-outboard direction. The vertical portion 82 is elongated vertically and in a vehicle-outboard direction. The horizontal portion 80 and the vertical portion 82 may be plate-shaped. The horizontal portion 80 and the vertical portion 82 may be generally perpendicular to each other. The horizontal portion 80 and the vertical portion 82 may meet at a corner 84 and form an L shape. The horizontal portion 80 may be elongated horizontally in a vehicle-rearward direction from the corner 84. The vertical portion 82 may be elongated vertically in a vehicle-upward direction from the corner 84. The vertical portion 82 may be press-fit into the sloping portion 72 of the webbing-guide shell 68. The vertical portion 82 includes a top edge 86 spaced from the corner 84. The top edge 86 may be sloped at substantially the same angle relative to horizontal in a vehicle-inboard direction as the top surface 78 of the sloping portion 72.

The member 66 is fixed to the seat frame 42. Specifically, the member 66 may be fastened to the seat frame 42 by one or more fasteners 87. The fasteners 87 may extend through the horizontal portion 80 and through the seat frame 42. The covering 46 extends between the webbing-guide shell 68 and the seat frame 42, and the covering 46 does not extend between the member 66 and the seat frame 42. The webbing-guide shell 68 is fixed to the member 66, and the fasteners 87 may hold the webbing-guide shell 68 down against the covering 46.

Figure 7:
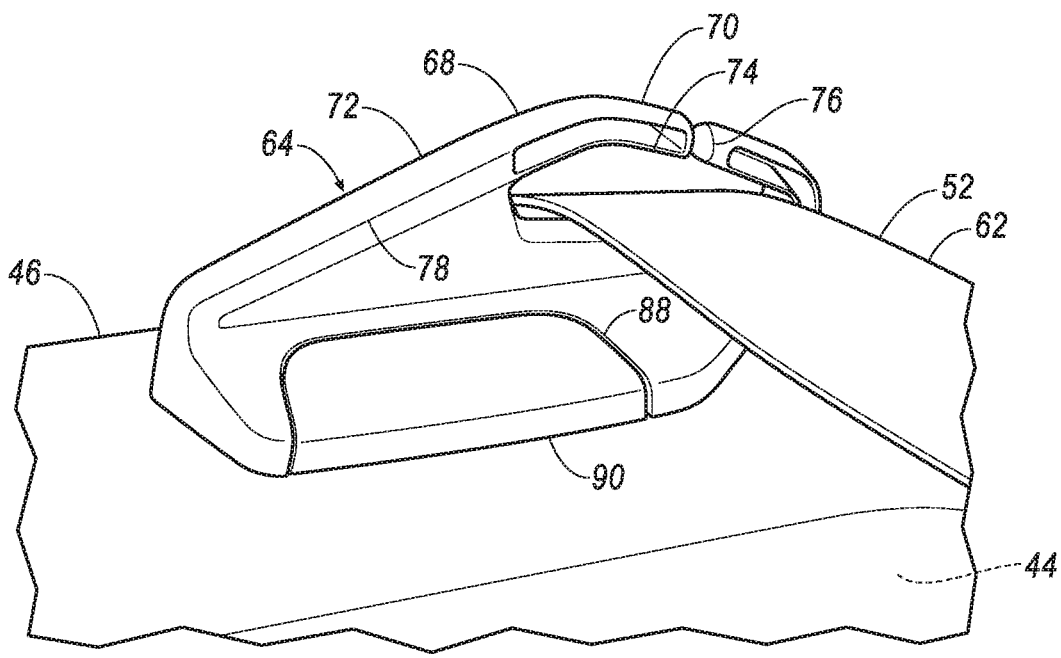
FIG. 7 is a rear view of the webbing guide.
Figure 8:
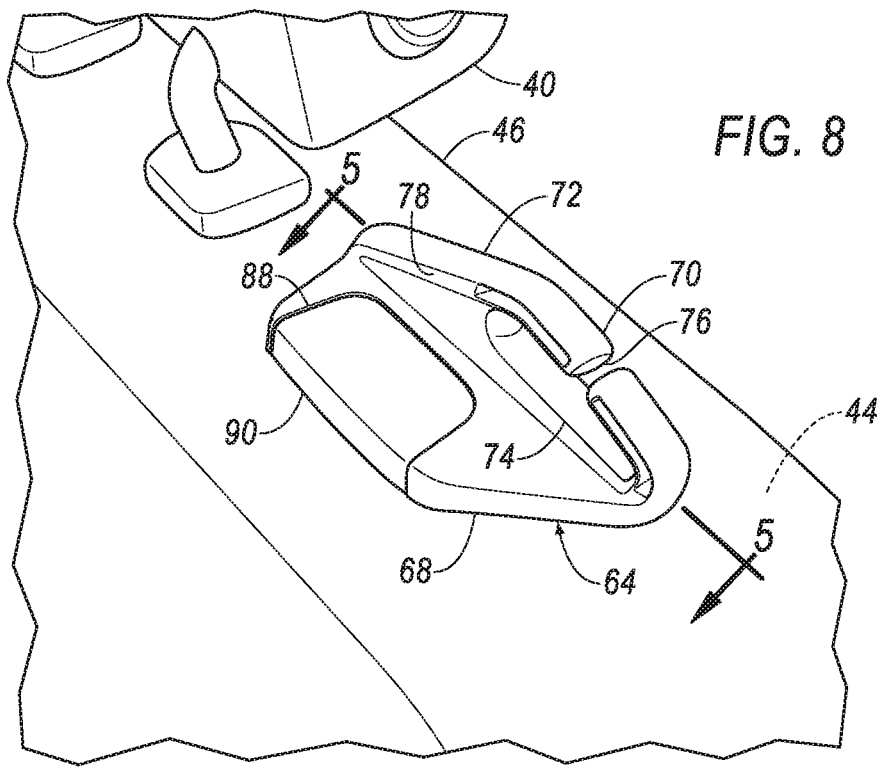
FIG. 8 is a top view of the webbing guide

With reference to FIGS. 7-9, the webbing-guide shell 68 includes a hole 88 positioned to permit access to the fasteners 87. The hole 88 may be positioned on the sloping portion 72 of the webbing-guide shell 68 below the top surface 78. The hole 88 may be positioned on a vehicle-rearward side of the webbing-guide shell 68. A cover 90 is engageable with the hole 88. For example, the cover 90 may include one or more hook arms 92, and the webbing-guide shell 68 may include one or more catch edges 94 sized to catch the hook arms 92 when the cover 90 is installed in the hole 88.

The material of the member 66 may be stronger than the material of the webbing-guide shell 68. For the purposes of this disclosure, "stronger" means requiring a greater force to initiate plastic deformation. For example, the webbing-guide shell 68 may be plastic, e.g., acrylonitrile-butadiene-styrene (ABS), nylon, polypropylene, polystyrene, etc., and the member 66 may be metal, e.g., steel.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a webbing-guide shell including a guide portion and a sloping portion, the guide portion including a slot and an opening from the slot through the guide portion, the sloping portion including a top surface sloping downwardly in a vehicle-inboard direction; and
   a member reinforcing the sloping portion, the material of the member being stronger than the material of the webbing-guide shell;
   wherein the member includes a vertical portion elongated vertically and a horizontal portion elongated horizontally; and
   the vertical portion includes a top edge sloping at substantially the same angle as the top surface relative to horizontal.

2. The restraint system of claim 1, wherein the top surface slopes at less than 45° from horizontal.

3. The restraint system of claim 1, further comprising a seat frame, wherein the member is fixed to the seat frame.

4. The restraint system of claim 3, wherein the member is fastened to the seat frame.

5. The restraint system of claim 3, wherein the member is fixed to a vehicle-outboard half of a top surface of the seat frame.

6. The restraint system of claim 5, further comprising a retractor positioned behind the webbing-guide shell.

7. The restraint system of claim 6, further comprising a webbing elongated from the retractor to in front of the webbing-guide shell.

8. The restraint system of claim 3, further comprising a covering extending around the seat frame and between the webbing-guide shell and the seat frame.

9. The restraint system of claim 1, wherein the member is press-fit into the webbing-guide shell.

10. The restraint system of claim 1, further comprising a fastener extending through the horizontal portion.

11. The restraint system of claim 10, wherein the webbing-guide shell includes a hole positioned to permit access to the fastener, the restraint system further comprising a cover engageable with the hole.

12. The restraint system of claim 11, wherein the hole is positioned on the sloping portion below the top surface.

13. The restraint system of claim 1, wherein the vertical portion is press-fit into the webbing-guide shell.

14. The restraint system of claim 1, wherein the webbing-guide shell is a single piece.

15. The restraint system of claim 14, wherein the member is a single piece.

16. The restraint system of claim 1, wherein the webbing-guide shell is plastic.

17. The restraint system of claim 1, wherein the member is metal.

18. The restraint system of claim 17, wherein the member is steel.

19. A restraint system comprising:
    a webbing-guide shell including a guide portion and a sloping portion, the guide portion including a slot and an opening from the slot through the guide portion, the sloping portion including a top surface sloping downwardly in a vehicle-inboard direction;
    a member reinforcing the sloping portion, the material of the member being stronger than the material of the webbing-guide shell, wherein the member includes a vertical portion elongated vertically and a horizontal portion elongated horizontally; and
    a fastener extending through the horizontal portion.

20. The restraint system of claim 19, wherein the webbing-guide shell includes a hole positioned to permit access to the fastener, the restraint system further comprising a cover engageable with the hole.

* * * * *